United States Patent
Hofmann et al.

(10) Patent No.: US 9,832,434 B2
(45) Date of Patent: Nov. 28, 2017

(54) METHOD FOR ACTIVATING A DEFLECTION DEVICE FOR A PROJECTION DEVICE, A DEFLECTION DEVICE FOR A PROJECTION DEVICE, AND A PROJECTION DEVICE

(71) Applicant: Fraunhofer-Gesellschaft zur Förderung der angewandten Forschung e.V., München (DE)

(72) Inventors: Ulrich Hofmann, Itzehoe (DE); Frank Senger, Hardenfeld (DE); Thomas von Wantoch, Kiel (DE); Christian Mallas, Schwentinental (DE); Joachim Janes, Itzehoe (DE); Manfred Weiss, Itzehoe (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 84 days.

(21) Appl. No.: 14/869,000

(22) Filed: Sep. 29, 2015

(65) Prior Publication Data

US 2016/0100139 A1    Apr. 7, 2016

(30) Foreign Application Priority Data

Oct. 2, 2014   (DE) ........................ 10 2014 220 115

(51) Int. Cl.
   *G02B 26/08* (2006.01)
   *H04N 9/31* (2006.01)
   (Continued)

(52) U.S. Cl.
   CPC ....... *H04N 9/3135* (2013.01); *G02B 26/0841* (2013.01); *G02B 26/101* (2013.01); *G02B 27/0927* (2013.01); *G02B 27/104* (2013.01)

(58) Field of Classification Search
   CPC .............. G02B 26/0841; G02B 26/085; G02B 26/0858; G02B 26/101; G02B 26/105;
   (Continued)

(56) References Cited

U.S. PATENT DOCUMENTS

| | | | |
|---|---|---|---|
| 2009/0059179 A1 | 3/2009 | Kobori et al. | |
| 2010/0165323 A1* | 7/2010 | Fiess | G01S 17/42 356/5.01 |
| 2011/0122101 A1 | 5/2011 | Kurozuka | |

FOREIGN PATENT DOCUMENTS

| | | |
|---|---|---|
| CN | 101517455 A | 8/2009 |
| CN | 101896851 A | 11/2010 |

(Continued)

OTHER PUBLICATIONS

"German Application No. 10 2014 220 115.2, English Translation of Office Action dated Aug. 11, 2015", (Aug. 11, 2015), 8 pgs.
"Chinese Application No. 201510646796.2, Office Action dated Jul. 3, 2017", w/ English Translation, (Jul. 3, 2017), 12 pgs.

*Primary Examiner* — James Phan
(74) *Attorney, Agent, or Firm* — Schwegman Lundberg & Woessner, P.A.

(57) ABSTRACT

A method for activating a deflection device comprising at least one deflection unit, for a projection device for projecting trajectories upon a projection surface, wherein the deflection device deflects electromagnetic radiation which is directed upon it, for producing trajectories, and the at least one deflection unit is activated by way of an activation signal delivered from a control device, for producing oscillations in each case with a turning amplitude at a direction change of the oscillation, about at least one deflection axis, wherein in the case of resonance, the oscillations have a maximal amplitude, at which the produced trajectories reach an edge of the projection surface. The activation signal is set in a manner such that the turning amplitude of the oscillations at least temporarily has a predefined value outside a region of (Continued)

the maximal amplitude of the oscillations, and an intensity distribution of the produced trajectories on the projection surface is achieved with a predefined intensity pattern. The document moreover relates to a deflection device as well as to a projection device.

18 Claims, 11 Drawing Sheets

(51) Int. Cl.
    *G02B 26/10*     (2006.01)
    *G02B 27/09*     (2006.01)
    *G02B 27/10*     (2006.01)

(58) Field of Classification Search
    CPC . G02B 27/0927; G02B 27/104; G03B 21/008
    USPC ......... 359/199.1–199.4, 201.1–202.1, 214.1,
                                       359/224.1–226.2; 353/49–50
    See application file for complete search history.

(56) References Cited

FOREIGN PATENT DOCUMENTS

| | | |
|---|---|---|
| DE | 102008055159 | 7/2010 |
| DE | 102009058762 A1 | 6/2011 |
| DE | 102012208566 | 11/2013 |

\* cited by examiner

METHOD FOR ACTIVATING A DEFLECTION DEVICE FOR A PROJECTION DEVICE, A DEFLECTION DEVICE FOR A PROJECTION DEVICE, AND A PROJECTION DEVICE

CLAIM OF PRIORITY

This application claims the benefit of priority of German Patent Application No. 10 2014 220 115.2, entitled "VERFAHREN ZUM ANSTEUERN EINER ABLENKEINRICHTUNG FÜR EINE PROJEKTIONSVORRICHTUNG, ABLENKEINRICHTUNG FÜR EINE PROJEKTIONSVORRICHTUNG UND PROJEKTIONSVORRICHTUNG," filed on Oct. 2, 2014, the benefit of priority of which is claimed hereby, and which is incorporated by reference herein in its entirety.

TECHNICAL FIELD

This document relates to a method for activating a deflection device for a projection device, to a deflection device, as well as to a projection device.

BACKGROUND

In so-called Lissajous projectors, mirrors oscillating resonantly or almost resonantly and thus sinusoidally in two axes are used. These mirrors, which are also indicated as resonance scanners, are capable of achieving very much greater amplitudes than non-resonantly operated scanners. Greater amplitudes with regard to a scanning laser projection can provide a higher optical resolution.

DE 10 2009 058 762 A1 discloses a deflection device for a projection device for projecting Lissajous figures onto a projection surface, and this is designed, in order to deflect a light beam about at least one first and second deflection axis, for producing the Lissajous figures. The deflection device comprises a deflection unit for producing oscillations about the deflection axes and a control device for producing activation signals for the deflection unit, with a first and a second activation frequency which essentially correspond to the resonance frequencies of the deflection unit, wherein the deflection unit has a quality factor>3000 and the activation device comprises a control loop that is designed to closed-loop control the first and/or the second activation frequency in a manner dependent on the measured phase position of the oscillations of the deflection unit, such that the maximal amplitude of the oscillations remains in the resonance region of the deflection unit. Thereby, the quality factor Q is defined as the ratio of the resonance frequency f0 for the bandwidth B, Q=f0/B, and the bandwidth B with the representation of the amplitude in dependence on the frequency is defined as the width of the resonance peak, at the location, at which the damping reaches 3.01 dB.

Among other things, with the use of resonantly operated scanners of this type, there is the problem of an excess intensity at an edge of the projection surface being able to occur at the reversal points of the oscillation if the beam intensity is temporally integrated with a defined time constant, on account of the minimal speed of the deflection unit. FIG. 4 below, along a line shows an intensity of electromagnetic radiation which is integrated with respect to time, with resonant operation of a resonance scanner with a constant activation frequency (FIG. 4, at the top) corresponding essentially to a resonance frequency of the oscillations, and with a constant maximal amplitude of the oscillations (FIG. 4, centre). One can recognize that the intensity at the end points of the line is increased, whereas the intensity has a minimum in the middle of the line. An application range of such scanners can be restricted due to an intensity increase at the end points of the line.

There exist applications, with which an increased temporally integrated light intensity is not desired at the end points, but at another location, e.g. in the middle of the line or according to an intensity pattern. This e.g. can be the case with illumination tasks, if for instance the centre of the scanned line is of a greater significance than the lateral boundary of the line. However, other applications are directed towards achieving an as homogenous as possible illumination of the line in the temporal mean. A higher intensity at an edge than in the middle of the illuminated surface can also occur in the case of a two-dimensional deflection of a light beam, thus if an area or surface is illuminated.

Scanners that are moved in a quasi-static (non-resonant) manner and at an almost uniform speed are therefore applied in such cases. The problem of not being able to realize large amplitudes of the deflection unit due to the low drives forces which are available, and moreover of a very soft spring suspension of the deflection unit possibly becoming necessary, however occurs with scanners which function in a quasi-static manner. A soft spring suspension however as a rule is very sensitive with regard to shock and vibration and thus has not been able to be meaningfully applied until now for some applications, such as in the field of automobiles.

A very robust scanner with an accordingly hard suspension of the deflection unit however is often necessary for applications with greatly acting vibrations and knocks. Such a scanner in most cases can only generate high amplitudes if it is resonantly operated.

SUMMARY

It may be advantageous to define a scanner concept that permits the necessary robustness with regard to vibrations and knocks to be achieved, wherein undesirable excesses of intensity on a projection surface are to be avoided or reduced.

This can be achieved by a method, a deflection device and a projection device such as explained herein.

In an embodiment of the invention, a method for activating (controlling) a deflection device comprising at least one deflection unit and for a projection device for projecting trajectories upon a projection surface is described herein. The deflection device can deflect electromagnetic radiation that is directed upon it, for producing trajectories, and the at least one deflection unit can be activated (controlled) such as by way of an activation signal (control signal) that can be delivered from a control device, such as for producing oscillations in each case with a turning amplitude at a direction change of the oscillation about at least one deflection axis, wherein the case of resonance, the oscillations have a maximal amplitude, at which the produced trajectories reach an edge of the projection surface. The activation signal can be set in a manner such that the turning amplitude of the oscillations has a predefined value at least temporally, outside a region of the maximal amplitude of the oscillations, and an intensity distribution of the produced trajectories on the projection surface with a predefined intensity pattern can be achieved.

The turning amplitude of the oscillations is thereby defined as a deflection of the deflection plate about a deflection axis during any oscillation, given a direction change of the oscillation. The deflection unit typically has a minimal speed at the turning amplitude of the deflection plate. If the amplitude of the oscillation for example in the form of a periodic function, e.g. a sine function, changes, then the maximum of the function forms the turning amplitude.

The maximal amplitude of the oscillations of the deflection unit about the at least one deflections axis is the largest value which the amplitude of the oscillations of the deflection unit about the at least one deflection axis can reach in the case of resonance, e.g., with a predefined maximal activation amplitude (predefined maximal control amplitude) and an activation frequency (control frequency) in the region of the resonance frequency of the at least one deflection axis, preferably two or more than two deflections axes. The edge of the projection surface can only be reached or illuminated by the produced trajectories with the presence of a maximal amplitude of the oscillations of the deflection unit, e.g., the edge of the projection surface can only be illuminated given the activation of the deflection unit by the control device with the predefined maximal activation amplitude and with the activation frequency which is tuned or matched to the resonance frequency of the deflection unit. This is typically effected after a transient procedure (transient response) or attack time (settling time). The deflection unit in the case of resonance thus typically at least temporarily is operated at a maximal amplitude of the oscillations, in order to also illuminate the edge of the projection surface.

A region of the maximal amplitude of the oscillations includes amplitudes which differ from the maximal amplitude of the oscillations by up to 1%. The maximal activation amplitude as a rule is fixedly predefined and should not exceed a value which is dependent on the respective deflection unit, e.g. in order to avoid damage to the deflection unit.

The trajectories can be imaged on the projection surface on a line if only one deflection axis is provided. The edge of the projection surface is then determined by the end points of the line. The projection surface can be scanned in another dimension, e.g. by way of a grid/raster scanning method, in order, despite this, to illuminate the complete projection surface. The method is not necessarily limited to a single deflection axis. The trajectories can form Lissajous figures in the case that the electromagnetic radiation is deflected about several deflection axes. Several deflection axes, e.g. 2 or 3 can be realised for example by way of several serially arranged deflection units or a single, multi-axis deflection unit. The Lissajous figures can be imaged on an area the projection surface.

The predefined value in the context of the application can also be a value region or be formed by a function. For example, the predefined region can be constant with regard to time or can temporally change. The predefined region can moreover periodically repeat itself. The predefined value or value region should however also lie outside the region of the maximal amplitude of the oscillations and in particular should have smaller values than the maximal amplitude of the oscillations.

A permanently resonant operation of the deflection unit with a maximal amplitude of the oscillations can be prevented at least temporarily, with the suggested method. E.g. the turning amplitude of the oscillations of the deflection unit, after this unit has reached the maximal amplitude, by way of setting the activation signal, can be set or reduced to a turning amplitude of the oscillation unit which is smaller than the maximal amplitude of the oscillations. The turning amplitude of the oscillations is thus typically not constant with regard to time. An intensity distribution of the electromagnetic radiation within the projection surface can be changed or set according to a predefined pattern, by way of the method. In particular, an undesirable intensity increase at an edge of the projection surface can at least be reduced.

The activation signal is typically set in a manner depending on the maximal activation amplitude and the activation frequency which is matched/tuned to the resonance frequency of the oscillations. The set activation signal can be calibrated before the starting operation of the deflection device. The mentioned calibration can also take place during the operation of the deflection device. The maximal activation amplitude and the activation frequency which is matched to the resonance frequency of the oscillations for example can be determined before starting operation of the deflection device. The maximal activation amplitude and the activation frequency which is matched to the resonance frequency of the oscillations are then taken into account when setting the activations signal, in a manner such that the turning amplitude of the oscillations has the predefined value outside the region of the maximal amplitude, at least temporarily, with the set activation signal. The activation signal which is to be set in each case thus determines the intensity distribution or the intensity pattern on the projection surface.

A shifting of the resonance frequency of the deflection unit can occur e.g. due to external influences such as temperature or vibrations. As a result, at least the activation frequency of the activation signal should be adapted to the shifted resonance frequency of the deflection unit in this case. It can become necessary to carry out the calibration of the deflection signal afresh at certain time intervals on account of this. For example, the calibration can be carried out before each starting operation of the deflection device. The calibration can also be carried out at fixed time intervals such as every hour, every day, every week, every month or every year.

In a further embodiment, the method can comprise the following steps:
  activating (controlling) the at least one deflection unit by way of the activation signal delivered by the control device, for producing resonant operations about the at least one deflection axis,
  determining a signal which represents the turning amplitude of the oscillations of the deflection unit,
  comparing the determined signal with a value which represents the maximal amplitude of the oscillations, and,
  if on comparison, the turning amplitude of the oscillations corresponds to the maximal amplitude of the oscillations, changing the activation signal in a manner such that the turning amplitude of the oscillations is at least temporarily reduced to the predefined value outside the region of the maximal amplitude of the oscillations.

The value which the maximal amplitude of the oscillations represents can be stored in the control device for example.

One can envisage the deflection unit in a first time interval being activated with a first activation signal, in a manner such that the maximal amplitude of the oscillations is reached after a transient of the oscillations, and the deflection unit in a second time interval being subsequently activated with a second activation signal, wherein the second activation signal differs from the first activation signal in a manner such that the turning amplitude of the oscillations is reduced, wherein the first time interval and the second time interval are successive. The first time interval and the second time interval for example are directly successive to one another and alternate with one another.

The temporal sequence of the activation signal can be given by way of stringing together the first and the second time interval in each case. Further time intervals can also be envisaged. For example, a third time interval, in which an activation amplitude of roughly zero is selected, begins after the second time interval. The turning amplitude of the oscillations then likewise settles to a value of zero. A dwell time or a temporally integrated intensity of the electromagnetic radiation in a middle of the projections surface can be increased by way of this. The deflection unit hereafter can again be operated in a resonant manner, i.e. the first interval comes again after the third time interval. The mentioned time intervals should be smaller than 30 ms, preferably smaller than 10 ms. Flickering effects or stroboscopic effects which are perceivable by the human eye can be reduced by way of this. The mentioned time intervals may be greater than 0.05 ms or greater than 0.1 ms or greater than 0.5 ms or greater than 1 ms.

In a further development, the deflection unit directly after reaching the maximal amplitude of the oscillations is activated with the second control signal in a manner such that the turning amplitude of the oscillations is reduced to the predefined value. A dwell time or a temporally integrated intensity of the electromagnetic radiation in an edge region of the projection surface can be reduced by way of this. The edge region of the projection surface is hereby defined as an environment around an edge of the projection surface of up to 10% of the total extension of the projection surface. The edge region of the projection surface thereby lies completely within the projection surface.

In one embodiment, a duration of the first team interval is smaller than a duration of the second time interval. The duration of the second time interval can for example be at least 2 times or at least 5 times or at least 10 times or at least 50 times or at least 99 times longer than the duration of the first time interval. The deflection unit can thus be activated with an activation signal which does not correspond to the resonant activation signal, in at least 33% of the time.

The second activation signal can be temporally constant or temporally change or be temporally periodic, in the second time interval.

The activation signal as a rule is determined by an activation frequency, an activation amplitude and an activation phase. The activation signal can be formed for example by a sine function with an amplitude, frequency and phase. In one design, an activation frequency (control frequency) and/or an activation amplitude (control amplitude) and/or an activation phase (control phase) and/or a pulse-pause ratio of the activation signal can be set or changed for achieving the mentioned identity pattern, wherein corresponding modulations, e.g. amplitude modulations, frequency modulations, phase modulations, pulse width modulations and likewise can be carried out. Different parameters of the activation signal can also be simultaneously set or changed or [closed-loop] controlled, for example the activation frequency as well as the activation amplitude are set or changed. A duration of the amplitude modulation, the frequency modulation, the phase modulation and/or the pulse width modulation (modulation duration) may be smaller than or equal to a picture repetition duration, wherein the picture repetition duration is defined as a reciprocal value of a picture repetition rate (see below). For instance, the modulation duration may be smaller than or equal to 1/2 or 1/10 or 1/60 or 1/100 times the picture repetition duration. The modulation duration may be equal to the second time interval or equal to the third time interval.

The parameters of the activation signals for setting one or more desired identity pattern of the electromagnetic radiation on the projection surface can be stored in a memory, e.g. in a memory of the control unit, and be called up for setting the activation signal.

In an embodiment, only the activation amplitude is set or changed (amplitude modulation), whereas the other parameters (activation frequency and activation phase) are kept fixed. In this case, the activation frequency is matched essentially to the resonance frequency of the deflection unit. Moreover, the activation amplitude of the activation signal is modulated such that the turning amplitude of the oscillations of the deflection unit as a temporal average is smaller than the maximal amplitude of the oscillations. The activation amplitude of the activation signal is maximal in the first time interval. The turning amplitude of the oscillations of the deflection unit then corresponds to the maximal amplitude of the oscillations, at least after an attack time. The turning amplitude of the oscillations will likewise reduce in a time-shifted manner by way of reducing the maximal activation amplitude in the second time interval. The oscillations of the deflection unit then no longer have a maximal amplitude, despite activation with a resonant activation frequency. As to how quickly the reduction of the turning amplitude is effected given a reduction of the activation amplitude depends on a quality of the deflection unit. Thus for example it would be possible for the activation amplitude in the second time interval to have a value which is less than 90% or less than 70% or less than 50% or less than 30% or less than 10% of the maximal activation amplitude or which is close to zero or is equal to zero. The turning amplitude of the oscillations reduces in a time-shifted manner by way of this, until it likewise assumes a reduced value or a value close to zero or equal to zero. The deflection unit would then temporarily no longer carry out an oscillation. This corresponds to an increase of the light intensity in the centre of and illuminated line on the projection surface or in the centre of an illuminated surface of the projection surface. The deflection unit can be subsequently activated again, e.g. according to the first time interval, with the maximal activation amplitude and with the activation frequency in the region of the resonance frequency of the deflection unit.

It is necessary for the amplitude modulation which is outlined above to be effected very quickly, so that on the one hand the human eye and the sensual perception which is inherent of this is not capable of resolving the individual variation steps, but only perceives a temporally integrated pattern. If the deflection unit has a very good quality factor, then despite the reduction of the oscillation amplitude of the activation signal, in the post-transient condition it would not immediately follow this amplitude change, but would continue to oscillate with a large amplitude for longer, the greater the quality factor of the deflection unit. The amplitude modulations outlined above would therefore be realised best of all if the deflection unit on the one hand were to have a sufficiently low quality factor (synonymous with a higher damping), in order to be able to very rapidly reduce the amplitude of the oscillations with regard to human sensory perception, but at the same time were to have the necessary drive force, in order to be able to oscillate up to large amplitudes within a short time (e.g. within 1/1000 second). The quality factor however should be larger than 40 or larger than 80, in order to achieve a robustness with regard to vibrations.

Deflection units with a large drive force can be realised in particular with electromagnetic or piezoelectric drives. A thermal drive likewise has high drive forces, but due to the limitation of the thermal conduction generally cannot realise the bandwidth and activation frequency which are necessary for the applications mentioned here. Electrostatic drives are quick and can also be designed such that the deflection unit is greatly damped, in order to be able to permit a adequately rapid attenuation of the amplitude of the oscillations. This however, as a rule, results in only very low amplitudes of the oscillations being able to be realised. A vacuum package around the deflection unit can make sense with electrostatic drives, for reaching greater amplitudes of the oscillations. Often, maximal amplitudes which are 20 times larger than with a normal pressure of about 1 atmosphere can be achieved in a vacuum package.

In a further embodiment, the activation frequency can also be changed (frequency modulation) alternatively or additionally to the amplitude modulation, in order to reduce the turning amplitude of the oscillations. One can succeed in the deflection unit being actively braked in a very short time despite the high quality factor, by way of the activation frequency of the activation signal being offset or detuned with respect to the resonance frequency. The frequency modulation can be carried out with a variable change rate. A rapid initial frequency change with a subsequent, more slowly changing activation frequency can be combined for example. The activation frequency can also be increased or reduced by a fixed value. The activation frequency must be changed to a greater or lesser extent, depending on a quality of the deflection unit, in order to reduce the turning amplitude of the oscillations of the deflection unit with respect to the maximal amplitude of the oscillations. Thus a deflection unit with a resonance frequency of 20 kHz and with a high quality factor of e.g. 10000 can already be completely braked by detuning the activation frequency by a few Hz. The amount of detuning of the activation frequency should not significantly exceed a bandwidth B of a resonance curve of the deflection unit, e.g. not more than twice the bandwidth B. With e.g. a resonance frequency of f0 20 kHz and a quality factor Q of 10000, with the application of the above definition of the quality factor Q=f0/B, it results that a detuning of the resonance frequency of maximal ±4 Hz is sufficient, in order to brake the deflection plate and as a result to reduce the turning amplitude of the oscillations. The quality factor can typically be larger than 3000, preferably greater than 10000, in particular greater than 500000 or greater than 100000.

The activation frequency can also be permanently modulated, in order to keep the turning amplitude at least temporarily outside the region of the maximal amplitude of the oscillations. The activation frequency for example can move periodically about a resonance frequency of the oscillations. The activation frequency for example can be modulated about the resonance frequency with a triangular function, a rectangular function or a sine function. The deflection plate in this case can only be exited with the resonance frequency for an infinitesimally small time.

A phase modulation of the activation signal can also be carried out alternatively or additionally to the frequency modulation and/or to the amplitude modulation, in order to maintain the turning amplitude at least temporarily outside the region of the maximum amplitude of the oscillations. The deflection unit thus for example is operated with a maximal activation amplitude and with a constant activation frequency which essentially corresponds to a resonance frequency of the oscillations. If now the activation phase is changed such that the deflection unit no longer receives its drive pulse at the right point in time, then the drive pulses can partly accomplish a braking effect or, with a counter-phase activation, a full braking effect.

An influencing of the turning amplitude of the oscillations can also be achieved by way of a change of the pulse-pause ratio on activation with a rectangular signal. In an embodiment, one envisages there being an accelerating effect and a braking effect at a predefined point in time If for example a pulse-pause ratio of more than 90% is selected, then the resulting turning amplitude of the oscillations is significantly below the maximum, by which means the light intensity in the centre of the projection surface increases. However, as a rule the maximal amplitude is achieved at 50% and light can be "transported" onto the edges. Values significantly therebelow permit the amplitudes to become smaller again.

In one design, a combination of activation frequency and/or activation amplitude and/or activation phase and/or pulse-pause ratio can be set or changed, in order to influence the turning amplitude of the oscillations and to achieve the intensity distribution of the produced trajectories on the projection surface with the specified intensity pattern.

Typically, the activation signal is set or changed in a manner such that the turning amplitude of the oscillations at least temporarily is smaller than 95% or smaller than 90%, preferably smaller than 70%, even more preferred smaller than 50%, of the maximal amplitude of the oscillations. The settings for the change region of the turning amplitude are determined from the characteristics of the deflection element and from the resolution of the projection surface. The change region for example is specified as the reciprocal of the minimal resolution in one axis. With regard to the definition when using pixels, the turning amplitude should preferably change by more than one "pixel width". For example, the turning amplitude of the deflection element in the case of a minimal resolution of 480×640 pixels should change by more than 1/480 (0.00283) and 1/640 (0.00146).

The signal which represents a turning amplitude of the oscillations can comprise different measurements, readings or signals. An amplitude of the oscillations for example can be directly measured. The phase and frequency of the oscillations can also be derived by way of a direct measurement of the course of the amplitude.

The signal which the turning amplitude of the oscillations represents can also alternatively or additionally comprise a temporally integrated intensity of the electromagnetic radiation on the projection surface. The turning amplitude of the oscillations can also be determined by such an intensity measurement. The deflection unit at least temporarily typically oscillates with the maximal amplitude if the complete projection surface, in particular the edge of the projection surface is illuminated. If an intensity increase of the electromagnetic radiation is measured at the edge of the projection surface, then this is an indication that the turning amplitude of the oscillations corresponds to the maximal amplitude. The intensity measurement can be effected with an optical sensor, e.g. CMOS, CCD, photodiode, photomultiplier or photo cell.

Alternatively or additionally, the turning amplitude or a phase position of the oscillations of the deflection unit can be detected or determined. The phase position or the turning amplitude can thereby be determined from an angular position of the deflection unit. Hereby, a zero-crossing of the oscillation can be utilised for determining the phase position. The phase is e.g. 0 or pi at the zero-crossing. The deflection unit preferably has an asymmetry of such a nature that the measured angular positions of the deflection unit differ at a phase of 0 and a phase of pi, in order to be able to differentiate between the two phases 0 and pi. The phase position and a point in time of the zero-crossing can be unambiguously assigned by way of this. The oscillation shape of the deflection unit can be modelled by a sine function given the knowledge of the points in time of the zero-crossings, assuming that the deflection unit oscillates sinusoidally. The phase position can continue to be measured in a continuous manner or in temporal intervals. Hereby, the temporal intervals should be smaller than an oscillation period, for example smaller than 1/6 of the oscillation period. The modelling of the oscillation shape with a sine function can be done away with by way of this.

The control device can comprise a control loop which is designed, in a manner dependent on a measured phase position of the oscillations of the deflection unit, to closed-loop control the activation frequency or the activation amplitude in a manner such that the turning amplitude of the oscillations has the predefined value. Such a control loop is described for example in DE 10 2009 058 762 A1.

In an embodiment, the turning amplitude of the oscillations or the phase position of the oscillations or the amplitude of the oscillations is measured optically, capacitively, magnetically, resistively, piezoresistively or piezoelectrically.

In a further design, the activation signal is set or changed such that the intensity distribution of the electromagnetic radiation obtains a local maximum at least on the middle of the projection surface. Moreover, the activation signal can be set or changed such that the intensity distribution of the electromagnetic radiation has a local minimum at an edge or in an edge region of the projection surface. Thereby, the activation signal can be set or changed such that both conditions are fulfilled, i.e. that the intensity distribution of the electromagnetic radiation obtains a local maximum in the middle of the projection surface, and a local minimum on an edge or in an edge region of the projection surface, cf. FIG. 7. The intensity maximum and the intensity minimum of the electromagnetic radiation can be set and/or changed within the projection surface, depending on the application of the method. One can envisage the electromagnetic radiation being deflected in a manner such that a dwell time (dwell duration) of the electromagnetic radiation in the middle of the projection surface is greater than at an edge of the projection surface, cf. FIG. 7.

With grid/raster methods from the state of the art, a repetition rate of picture points is fixedly set. A grid for example is scanned from the top to the bottom or from the left to the right. Disturbances of the picture or a flickering can occur if temperature fluctuations, vibrations or knocks caused by external influences occur during the grid/raster method.

It can be advantageous if the trajectories have no fixed repetition rate, with applications where vibrations, knocks and temperature fluctuations of up to 120° C. (from −40° C. to 80° C.) play a part, e.g. in the field of automobiles. Another infinite sequence of scanning can even be selected for each individual trajectory. A flexibility and robustness of the method can be increased by way of this.

In an embodiment, the activation signal is set or changed such that the trajectories on the projection surface are not stationary and/or that the trajectories have no fixed repetition rate. If several deflection axes are provided, then the activation frequencies of the respective deflection axes therefore also do not need to be in an integer ratio to one another. With a picture projection device, this would mean that there is no fixed, predictable sequence of a picture memory read-out procedure, since the sequence of the scanning of a projection surface is not constant.

The temporal variation of the trajectories further results in the favourable condition that undesired speckle patterns, which can occur with laser projections, are perceivably reduced, since it is not always the same, but different scatter centres which are hit on the projection surface. This however results in the speckle patterns also varying and being averaged by the eye by way of superposition and temporal integration. This is an advantage compared to all laser projection methods with stationary trajectories.

The picture repetition rate describes the rate at which different trajectories are successive to one another. The picture repetition rate should be at least 30 Hz, in particular 60 Hz, preferably at least 100 Hz, particularly preferably 400 Hz. Flicker effects or stroboscopic effects which are perceivable to the human eye can be reduced by way of this.

As a rule, extremely rapid deflection units are required for the projection of highly resolved pictures, such as in the case of a HDTV resolution. The frequency of the resonant oscillations of the deflection unit should be at least 1000 Hz in order to meet these demands. The resonance frequency is preferably greater than 3000 Hz, in particular greater than 10 kHz or greater than 30 kHz.

A deflection device for a projection device for projecting trajectories onto a projection surface, and which is designed for deflecting electromagnetic radiation for producing the trajectories, is made available with the present invention. The deflection device comprises
  at least one deflection unit for producing oscillations about at least one deflection axis, and
  a control device for producing an activation signal for the deflection unit.
    In a further development, the deflection device comprises means for detecting a measurement signal representing a turning amplitude of the oscillations of the deflection unit. The deflection unit in particular is designed for carrying out the previously described method.

A projection device with a previously described deflection device and a beam source (radiation source) for producing electromagnetic radiation with a first wavelength or with a first wavelength region is also put forward with the present applications. An illumination screen is provided as a projection surface and is designed to convert the first wavelength or the first wavelength region of the deflected electromagnetic radiation into a second wavelength or into a second wavelength region. Hereby, the second wavelength or the second wavelength region is typically lower in energy than the first wavelength or the first wavelength region. The second wavelength or the second wavelength region preferably encompasses visible light.

Apart from the deflection device, a modulation unit for modulating the intensity of the electromagnetic radiation of the radiation source in a manner depending on a picture to be projected and a location of the electromagnetic radiation on the projection surface is preferably additionally provided, with the projection device for projecting a picture onto the projection surface. In one embodiment, the intensity of the electromagnetic radiation of the radiation source is constant while the activation signal is set to achieve an intensity distribution with a predefined intensity pattern. Within the scope of the present application a constant intensity of electromagnetic radiation means that the intensity of the electromagnetic radiation does not fluctuate more than 10% or more than 5% or more than 1% around a predetermined mean value while the activation signal is set. In another embodiment, the intensity of the electromagnetic radiation of the radiation source is modulated while the activation signal is set to achieve an intensity distribution with a predefined intensity pattern.

In a preferred embodiment, the deflection unit comprises at least one micromirror, wherein an optical total scanning angle specifying the deflection of the mirror is >30 degrees, preferably >40 degrees and even more preferred >60 degrees. Thereby, the micromirror can be a two-axis micromirror which is cardanically suspended on torsion springs, but single-axis mirrors arranged one after the other can also be used. Usually, the mirror used in the deflection device will oscillate about two axes which are arranged orthogonally to one another. However, angles differing from 90 degrees can also be enclosed between the scanning and deflection axes.

The deflection device is not necessarily limited to one or two deflection axes. Three or more serially arranged single-axis deflection units or a single three-axis or multi-axis deflection unit could also be applied for example. Thus a scanner with for example three or more torsion suspensions and/or bending spring suspensions can also be used, in order to realise a complex, tightly packed Lissajous trajectory.

The embodiments are also not limited to a specific constructional manner of the scanner, e.g. to a cardanic suspension of the mirror or to a special drive manner such as a drive manner with electrode combs for example. A precondition is always that the provided projection surface is scanned at a sufficient speed and density by the projection beam. This could also be achieved by an actuator, which does not achieve the beam deflection by reflection at a mirror, but by way of a refracting or diffracting element.

The suggested method, the deflection device and the projection device can be used in different applications, e.g. in laser projection displays, illumination systems or in machines for laser material machining. Miniature projectors which are accommodated in mobile consumer products, but just as easily head-up displays in aircraft and automobiles, belong to the relevant applications for example. Other fields of application can be dashboard displays or data glasses/goggles. Headlight systems which can have display characteristics represent a further application.

BRIEF DESCRIPTION OF THE DRAWINGS

Embodiment examples of the invention are represented in the figures and are explained in more detail in the subsequent description.

In the figures are shown in.

Recurring features are provided with the same reference numerals in the figures.

DETAILED DESCRIPTION

Figure 1:
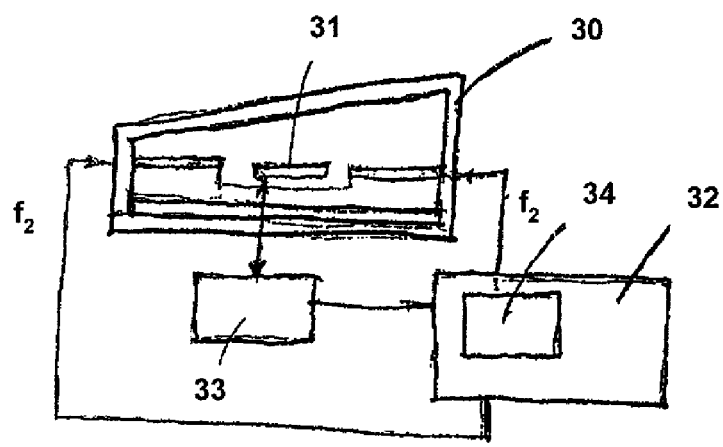
FIG. 1 a schematic representation of a deflection device.

A deflection unit which as a deflection element 31 comprises a two-axis, cardanically suspended micromirror 31 is schematically represented at 30 in FIG. 1. The deflection unit or the micromirror 31, whose drive is not represented in more detail, is driven at the frequencies f1 and f2 as activation frequencies and with the activation amplitudes A1 and A2, for each axis, by way of an activation signal which is delivered from an activation device 32, The activation device 32 comprises a control loop 34 which is designed to closed-loop control the activation signals. The control loop 34 represented in FIG. 1 is only indicated schematically for both axes, but a control loop can be provided for each oscillation axis. A measurement device 33 which measures the deflection of the micromirror 31 is provided for detecting the amplitude or the phase position of the oscillations. The amplitude or the phase position of the oscillations can be detected with the help of optical or capacitive, piezoresistive or piezoelectric sensors.

The position and phase position of a resonant mirror can be optically detected in a time-resolved manner via a monitor laser beam and a position-sensitive 2D photodiode (PSD). Different photocurrents are tapped at the four pick-up electrodes of the PSD, depending on the location of incidence of the laser beam deflected at the mirror, and are converted by way of a current-to-voltage converter and subsequent difference formation, sum formation and finally quotient formation (difference divided by the sum) into a time-resolved XY position signal.

Concerning the piezoresistive measurement method, the mechanically induced stress in the torsion springs and which is produced during the torsion oscillation and is dependent on the deflection angle effects a resistance change in the sensor structures. This as a rule is evaluated by a Wheatstone bridge and delivers an output signal which is proportional to the torsion angle.

With regard to piezoelectric sensors based e.g. on aluminium nitride layers or lead zirconate titanate layers, the twisting of the torsion spring produces a lattice change which causes a charge shift. The spatial charge change can be measured as a voltage proportional to the tilt angle.

With capacitive evaluation methods, the temporally changing capacitance between the static and the moving sensor electrode fingers and which is dependent on the tilt angle is evaluated. A whole series of different evaluation methods are known from literature. So-called carrier frequency methods are often applied. For this, a high-frequency modulated voltage is applied to the sensor comb structures. The movement of the finger-like capacitors produces a capacitive current, whose signal shape represents an amplitude modulation of the carrier signal. With amplitude modulation, the information is obtained via the mirror movement and can be extracted by multiplication (mixing) and filtering.

Figure 2:
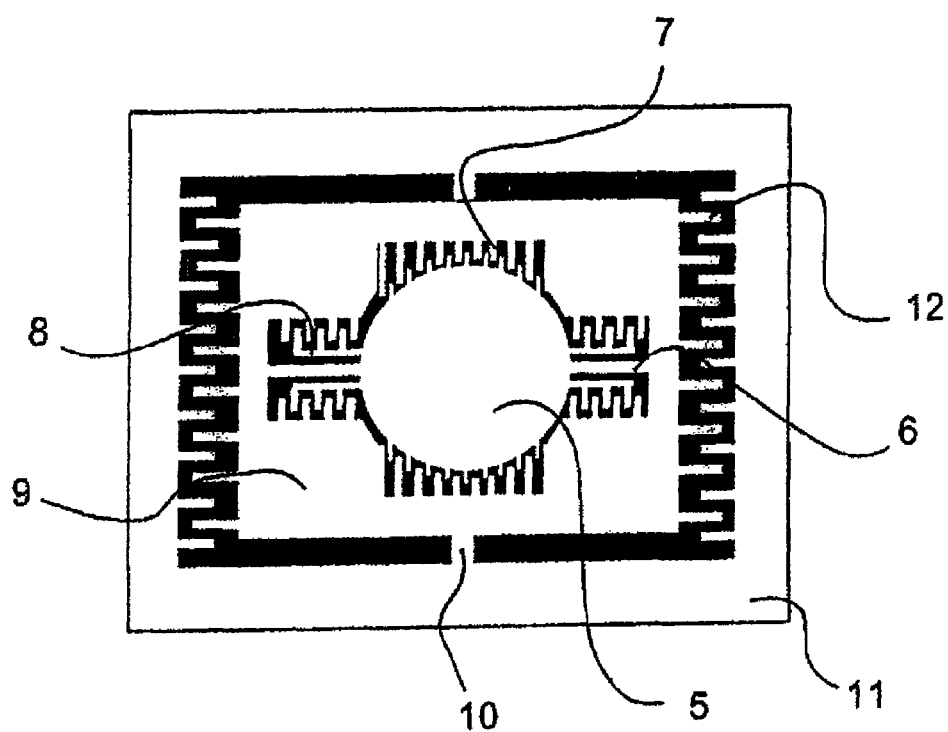
FIG. 2 a plan view onto a two-axis, cardanically suspended micromirror with comb drives.

A two-axis, cardanically suspended micromirror 5, as can be used in FIG. 1, is represented in FIG. 2. Electrostatic, axis-remote comb drives 7 and axis-close comb drives 8 are represented, and these can also be used as sensor electrodes. The mirror plate 5 is suspended via torsion springs 6, in a movable frame 9 which in turn is suspended by torsion springs 10 in a fixed chip frame 11. The frame 9 can be brought into resonance by way of electrostatic comb drives 12, wherein axis-close comb electrodes for drive purposes and sensor purposes of the movable frame 9 have been omitted for a better overview.

Figure 3:
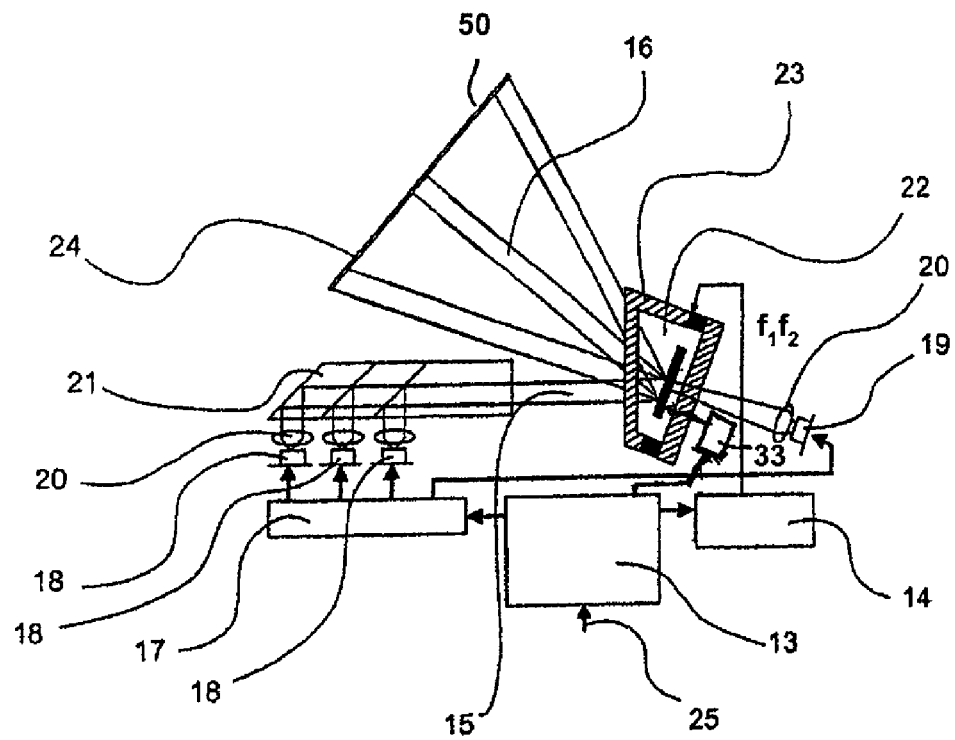
FIG. 3 a schematic view of a projection device with a deflection device.

An arrangement of a Lissajous laser projection device is represented FIG. 3. This projection device comprises a deflection device according to FIG. 1, wherein here the vacuum-encapsulated two-axis mirror scanner is indicated with the reference numeral 22. Three continuous beam lasers 18 with a temporally constant radiation intensity, whose light or radiation is parallelised by collimators 20 and shaped into a coaxial beam 15 by a beam unification system 21 are provided as a beam source (radiation source). The applied laser light has a wavelength of 400 nm. The laser sources 18 can also have different colours, such as e.g. red, green and blue. The coaxial beam 15 is directed onto the mirror by way of the oblique glass lid 23 of the mirror scanner 22. The deflected laser beam 16 illumines a projection surface 24 in a two-axis manner. The projection surface 24 can be designed as an illumination screen 50 which converts the wavelength of the laser light from 400 mm into a wavelength of e.g. 600 nm. Digital picture data is delivered via an input 25 to a digital signal processing and control unit 13, in which control impulses corresponding to the picture data are transferred to an analog control unit 17. The measuring device 33 for measuring the deflection of the mirror of the deflection unit 23 is indicated at 33, and is connected to the signal processing and control unit 13. The latter also controls an analog voltage amplifier 14. This, with parts of the signal processing and control unit 13, forms the activation device according to FIG. 2, wherein here only one activation signal lead for both deflection axes with the activation frequencies f1, f2 and the activation amplitudes A1 and A2 is represented.

A modulation unit which is not shown, for modulating the intensity of the electromagnetic radiation of the continuous beam laser 18 in a manner dependent on a picture to be projected and on a location of the electromagnetic radiation on the projection surface 24 can additionally be provided.

The resonance frequency of the deflection unit for the deflection axes is 11 kHz and 11.5 kHz respectively. A picture repetition rate is greater than 60 Hz, but smaller than 600 Hz, e.g. 500 Hz. The activation signal is closed-loop controlled by the [closed-loop] control unit 34 such that the trajectories are not stationary or that the trajectories have no fixed repetition rate.

The projection device is suitable for an application in the field of automobiles, and for example the projection device can be applied as a headlight of a vehicle. The projection device which is shown in FIG. 3 in particular is designed for carrying out a subsequently described method.

The intensities which are shown in FIGS. 4 to 7 are limited to one deflection axis for an improved overview. Furthermore, only the activation frequencies of the activation signal and the turning amplitudes of oscillations about one deflection axis are shown in FIGS. 4 to 7.

Figure 4:
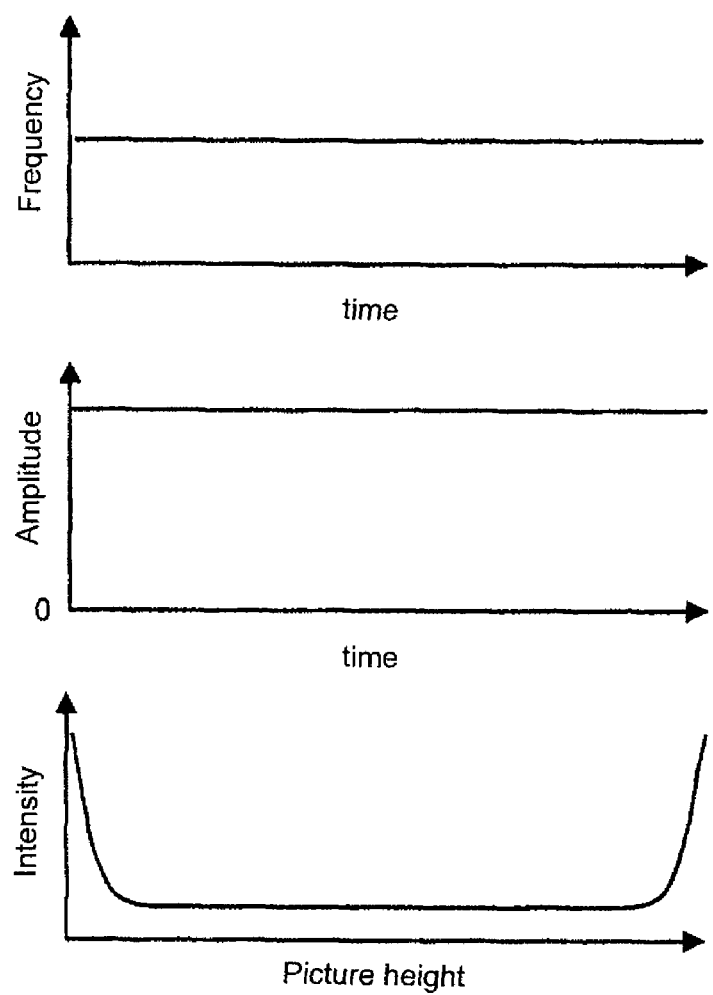
FIG. 4 an integrated intensity (below) of electromagnetic radiation along a picture height at a constant activation frequency (above) and at a constant turning amplitude of the oscillations (middle)

The lower graph of FIG. 4 shows an intensity distribution along a line (picture height), as is typically achieved with deflection device according to the state of the art. The activation frequency of the activation signal is plotted against time in the picture at the top, whereas the turning amplitude of the deflection unit is plotted against time in the middle picture. The activation frequency is tuned to the resonance frequency of the deflection unit. The activation amplitude moreover has a maximal predefined value. The deflection unit oscillates essentially preferably or approximately harmonically with a maximal amplitude on account of this. The movement of the deflection unit slows down at the reversal points of the harmonic oscillation. A dwell time of the light at the edges of the deflection unit is greater than in the middle of the deflection unit by way of this. A dwell time of the deflected laser light at the edge points of the line is thus higher than in the middle of the line. The temporally integrated intensity of the light is greater at the edge points of the line than in the middle of the line on account of this.

Figure 5:
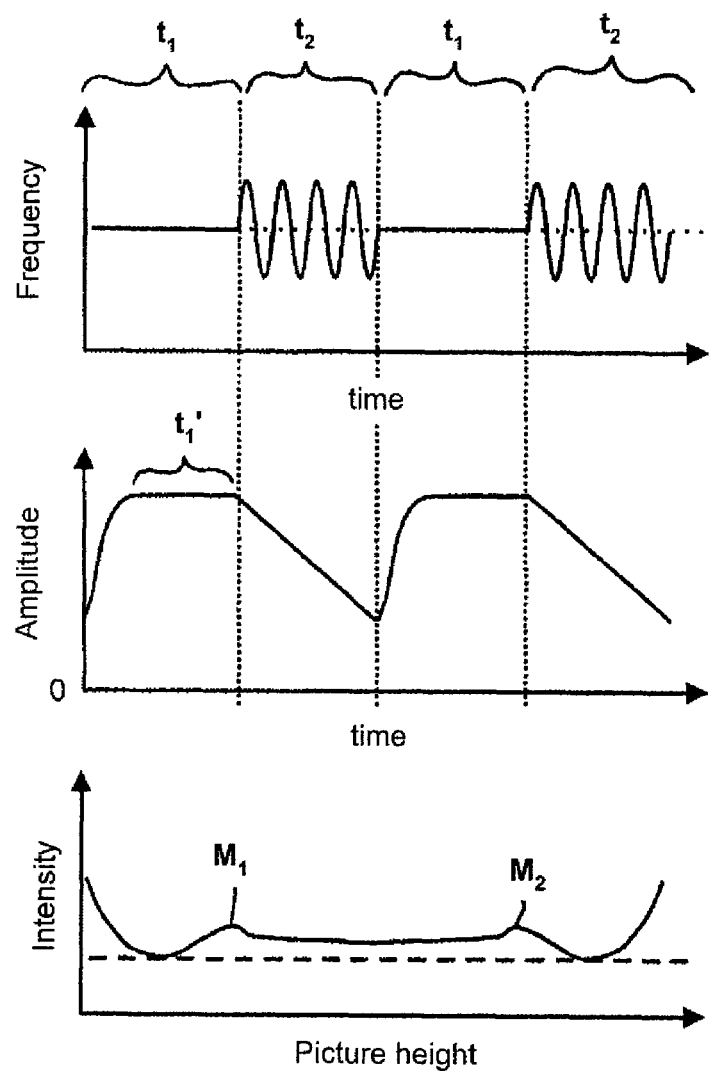
FIG. 5 a intensity distribution (below) according to one embodiment of the application, of electromagnetic radiation along a picture height, at a non-constant activation frequency (above) and at a non-constant turning amplitude of the oscillations (middle)
Figure 6:
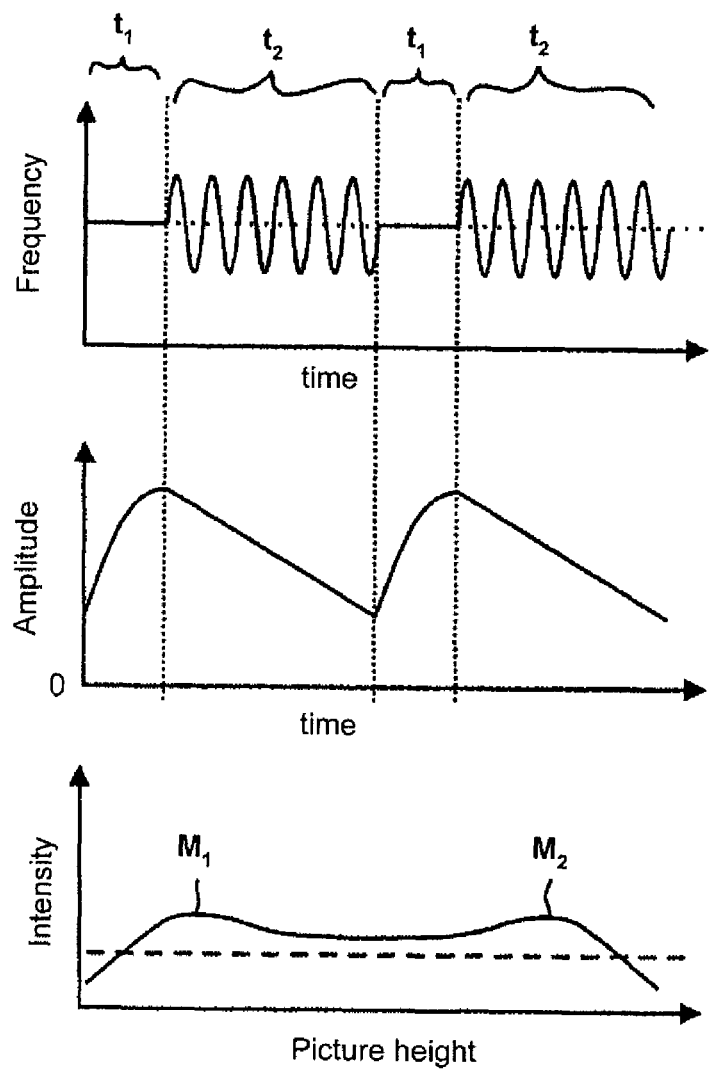
FIG. 6 a further intensity distribution (below) according to an embodiment of the application, of electromagnetic radiation along a picture height at a non-constant activation frequency (above) and at a non-constant turning amplitude of the oscillations (middle)
Figure 7:
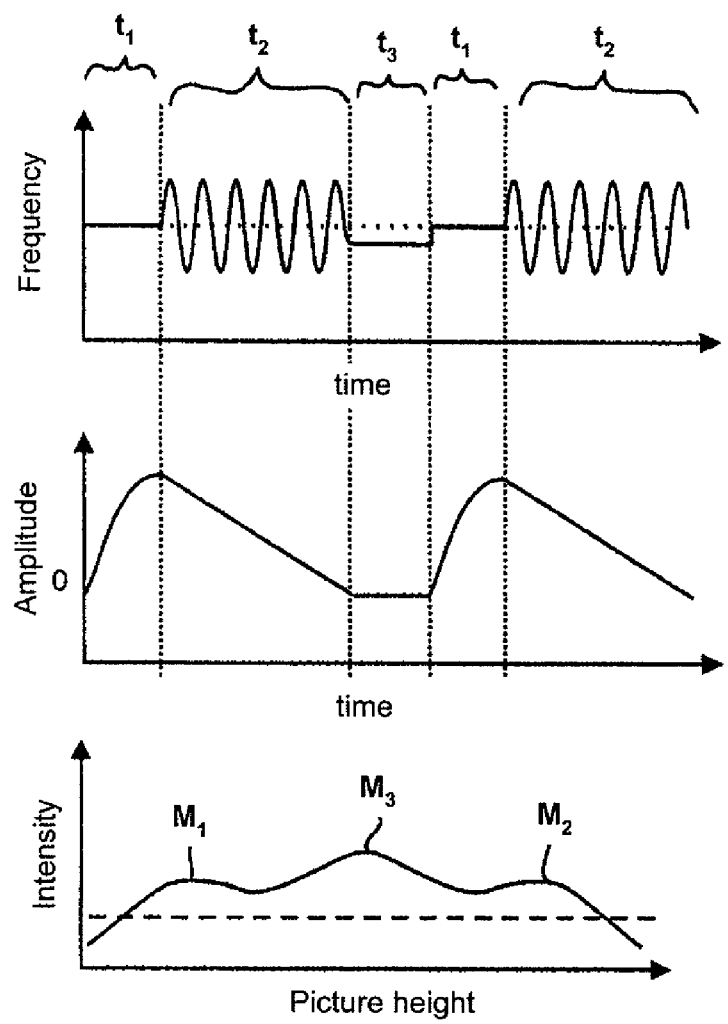
FIG. 7 a further intensity distribution (below) according to an embodiment of the application, of electromagnetic radiation along a picture height at a non-constant activation frequency (above) and at non-constant turning amplitude of the oscillations (middle)

An intensity distribution of the light with a set intensity pattern along a line on the projection surface 24 is represented in FIGS. 5, 6 and 7 (below) and this intensity distribution is made possible by way of the designs of the method according to the invention. The activation frequency of the activation signal (above) as well as the turning amplitude of the oscillations (middle) is moreover plotted against time in each case in the FIGS. 5, 6 and 7. The activation frequency can hereby be taken from the control device. A signal which represents a turning amplitude of the oscillations of the deflection unit is continuously detected by the measurement device.

Figure 11:
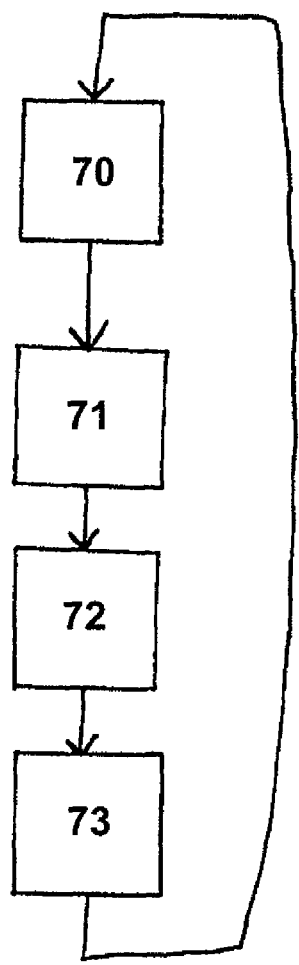
FIG. 11 a block diagram according to an embodiment of the method according to the application.

FIGS. 5 and 11 are hereinafter referred to. Time intervals t1, t2 are indicated in FIG. 5. The deflection unit is activated with a first constant activation frequency corresponding to the resonance frequency of the deflection, according to a sine function, in the time interval t1. The activation amplitude of the sinusoidal activation signal has a maximal predefined value. The control device in the time interval t1 thus activates the deflection unit with an activation signal, with which resonant oscillations with a maximal amplitude can be produced, cf. step 70 in FIG. 11. The turning amplitude of the oscillations of the deflection unit increases during the attack time until it reaches its greatest value (maximal amplitude) in the case of resonance.

The turning amplitude of the oscillations is constantly measured, cf. step 71 of FIG. 11 and is compared with a maximal amplitude of the oscillations, cf. step 72. The closed-loop unit modulates the activation frequency if the turning amplitude of the oscillations corresponds to the maxima value, cf. step 73 of FIG. 12. In the represented embodiment example, the activation frequency is not modulated immediately after reaching the maximal amplitude of the oscillations, but after a fixed, predefined time t1' after reaching the maximal amplitude of the oscillations. The modulation of the activation frequency takes place at the beginning of the interval t2. The activation frequency is hereby modulated with a sine function with a constant frequency. The deflection unit is no longer driven in a resonant manner due to the change of the activation frequency. The oscillations of the deflection unit are braked by the activation frequency different to the resonance frequency, by which means the turning amplitude of the oscillations is reduced. The turning amplitude of the oscillations at the end of the time interval t2 reaches a value which corresponds roughly to 38% of the maximal amplitude of the oscillations. The measured light intensity shifts from the edge points of the line in the direction of the middle of the line due to the reduction of the turning amplitude of the oscillations. In contrast to the light intensity of FIG. 4, there are two local maxima M1 and M2 in FIG. 5, and these are located in each case between the edge points and the middle of the line. The activation frequency in the subsequent time interval t1 is subsequently again matched to the resonance frequency of the oscillations. The turning amplitude of the oscillations increases again on account of this. The time intervals t1 and t2 are equally long in the embodiment example.

FIG. 6 is hereinafter referred to. The deflection unit in the time interval t1 is driven with an activation frequency which is matched to the resonance frequency of the oscillations. The activation amplitude in the shown example is constant and has a maximal predefined value. In the time interval t1, the control device thus activates the deflection unit with an activation signal, with which resonant oscillations with a maximal amplitude can be produced. The turning amplitude of the oscillations during an attack time increases up to the maximal amplitude due to this. A modulation of the activation frequency sets in immediately (time interval t2) when the turning amplitude of the oscillations corresponds to the maximal amplitude of the oscillations. The amplitude of the oscillations thus only reaches the maximal amplitude for an infinitesimally short point in time. The frequency modulation of the activation signal thereafter leads to the turning amplitude being reduced to 38% of the maximal amplitude. The duration of the time interval t2 is about three times as long as the duration of the time interval t1. The activation frequency is temporally periodically modulated with a sine function, as in FIG. 5. The activation frequency is again controlled to the resonance frequency of the oscillations.

A further example with regard to a shifting of the light intensity away from the edge points in the direction of the middle of the line is shown in FIG. 7. The deflection unit in the time interval t1 firstly oscillates by way of applying an activation signal with an activation frequency which is matched to the resonance frequency of the oscillations. The activation amplitude in the shown example is constant and has a maximal value. The control device in the time interval t1 thus activates the deflection unit with a resonant activation signal. A frequency modulation of the activation frequency sets in immediately on reaching a maximal angle or the resonant oscillations of the deflection unit, so that the turning amplitude of the oscillations reduces again from the beginning of the time interval t2. The turning amplitude of the oscillations in this example reduces to a value of about zero in the time interval t2. The turning amplitude of the oscillations is held there by way of an activation signal of an unadapted frequency in the time interval t3, until the deflection unit begins to oscillate up again due to the renewed change of the activation frequency to a resonant activation frequency which corresponds essentially to the resonance frequency of the deflection unit. The unadapted activation frequency in the time interval t3 is 10890 Hz and is thus 110 Hz less than the resonance frequency of the deflection unit of 11 kHz. The longer dwell time of the deflecting plate with a non-deflected angle results in an intensity maximum M3 being shifted into the picture middle, whereas the intensity minimum is to be located at the edge. The time intervals t1 and t3 are equally long in the shown example.

Only the activation frequency was changed in the described embodiment examples. The activation amplitude is not changed in the embodiment examples and has a maximal value, by which means the edge points of the line can be illuminated on the projection surface. Of course, the activation amplitude and/or the activation phase and/or the pulse-pause ratio of the activation signal can be changed alternatively or additionally to the activation frequency (see below).

The time intervals t1, t2, t3 and t4 are preferably shorter than 30 ms or shorter than 10 ms. Flicker effects which are visible to the human eye can be reduced or avoided by way of this. The time intervals t1, t2, t3, and t4 may be greater than 0.05 ms or greater than 0.1 ms or greater than 0.5 ms or greater than 1 ms.

Figure 8:
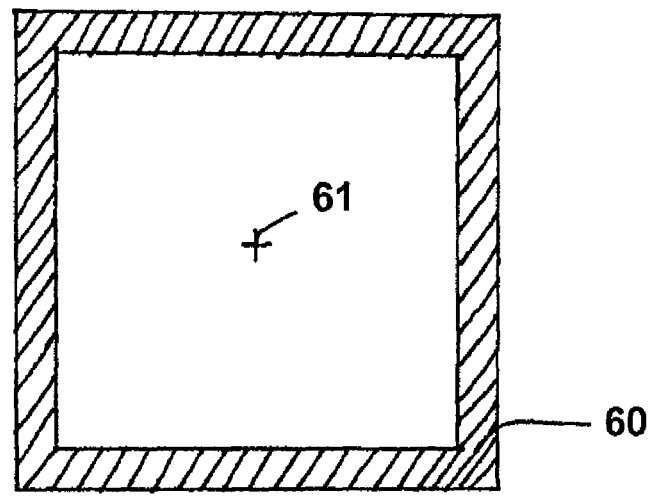
FIG. 8 an integrated intensity of electromagnetic radiation on a projection surface at a resonant activation frequency and at a maximal amplitude of the oscillations.

FIG. 8 shows an intensity distribution on a projection surface, as is typically achieved with deflection devices with two deflection axes according to the state of the art. Whereas the one-dimensional case (intensity distribution along a line) is shown in FIG. 4, the two dimensional case (intensity distribution on a surface) is shown in FIG. 8. An integrated light intensity is higher in an edge region 60 of the surface than in the middle 61 of the surface. The activation frequencies f1, f2 are matched to the resonance frequencies of the deflection unit. The activation amplitudes are A1, A2 are moreover maximal. The deflection unit oscillates about the two deflection axes essentially preferably or approximately harmonically in each case with a constant turning amplitude by way of this. The movement of the deflection unit slows down at the reversal points of the harmonic oscillations. A dwell duration of the light at the edges of the deflection unit is higher that in the middle of the deflection unit on account of this. An integrated light intensity is therefore higher in the edge region 60 of the surface than in the middle 61 of the surface.

Figure 9:
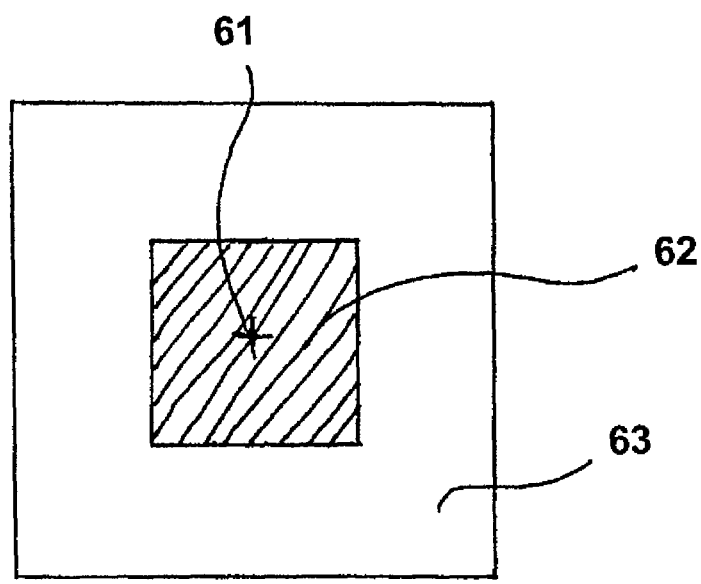
FIG. 9 an intensity distribution according to an embodiment of the application, of electromagnetic radiation on a surface, at a non-constant activation frequency and a non-constant turning amplitude of the oscillations.

An intensity distribution of the light on a surface and which is made possible by one embodiment of the method according to the invention is represented in FIG. 9. The embodiment of FIG. 9 corresponds to the embodiment of FIG. 7 in two dimensions. The corresponding deflection device thus comprises two deflection axes, by which means Lissajous figures can be produced on the projection surface. The turning amplitudes of the oscillations are reduced by way of frequency modulation of both activation frequencies f1 and f2 (widened to two dimensions corresponding to the embodiment of FIG. 7). A dwell time of the light in a region 62 around the middle 61 of the surface is higher than in an edge region 60 of the surface by way of this. The intensity distribution of FIG. 9 thus differs from the intensity distribution of FIG. 8. In FIG. 9, a region 62 around the middle 61 of the surface has a higher, integrated light intensity than the region 63 adjacent this region 62.

Figure 10:
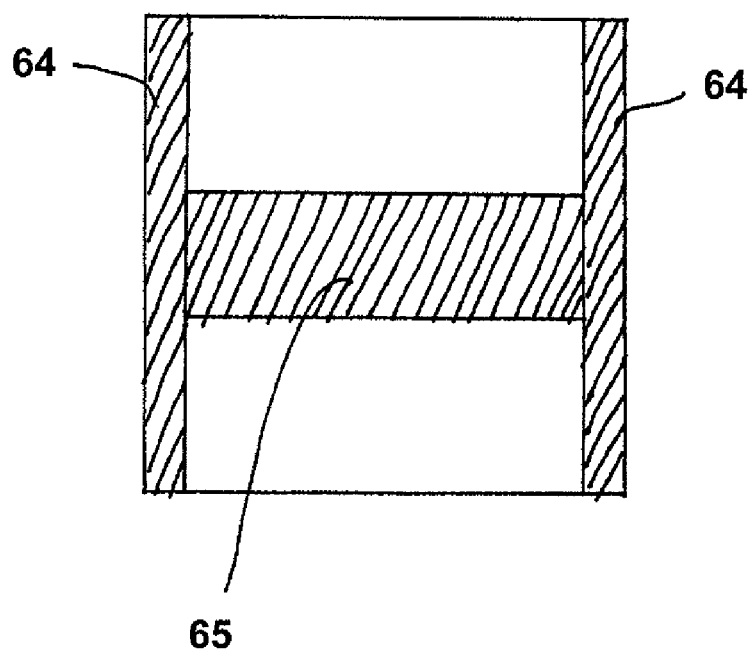
FIG. 10 an intensity distribution according to a further embodiment of the application, of electromagnetic radiation on a surface.

A further intensity distribution of the light on a surface and which is made possible by a further embodiment of the method according to the invention is represented in FIG. 10. As in FIGS. 8 and 9, the deflection unit comprises two deflection axes. FIG. 10 represents a mixed form of the FIGS. 8 and 9. A first activation signal is a constant, resonant activation signal in FIG. 10. The first activation signal is thus not modulated. A second activation signal is modulated, in order at least temporarily to reduce a second turning amplitude of the oscillations of the deflection unit. The deflection unit oscillates resonantly about the first deflection axis by way of this, whereas the deflection unit at least temporarily, e.g. as in the time interval t2, does not oscillate resonantly about the second deflection axis. An intensity distribution in an edge region 64 is essentially unchanged on account of this and corresponds to the edge region 60 of FIG. 8. Moreover, a strip 65 with an increased light intensity is located roughly in the middle of the surface due to the modulation of the second activation signal.

FIG. 11 shows a block diagram of an embodiment of the method according to the invention. FIG. 11 shows the steps:

Activating (controlling) the deflection unit 30 by way of a resonant activation signal (resonant control signal) in step 70;

detecting a turning amplitude of the oscillations in step 71;

comparing the turning amplitude of the oscillations with a maximal amplitude of the oscillations in step 72; and if the turning amplitude corresponds to the maximal amplitude, changing the activation signal in a manner such that the turning amplitude of the oscillations is reduced to a predefined value, in step 73. After step 73, one starts over again with step 70.

Figure 12:
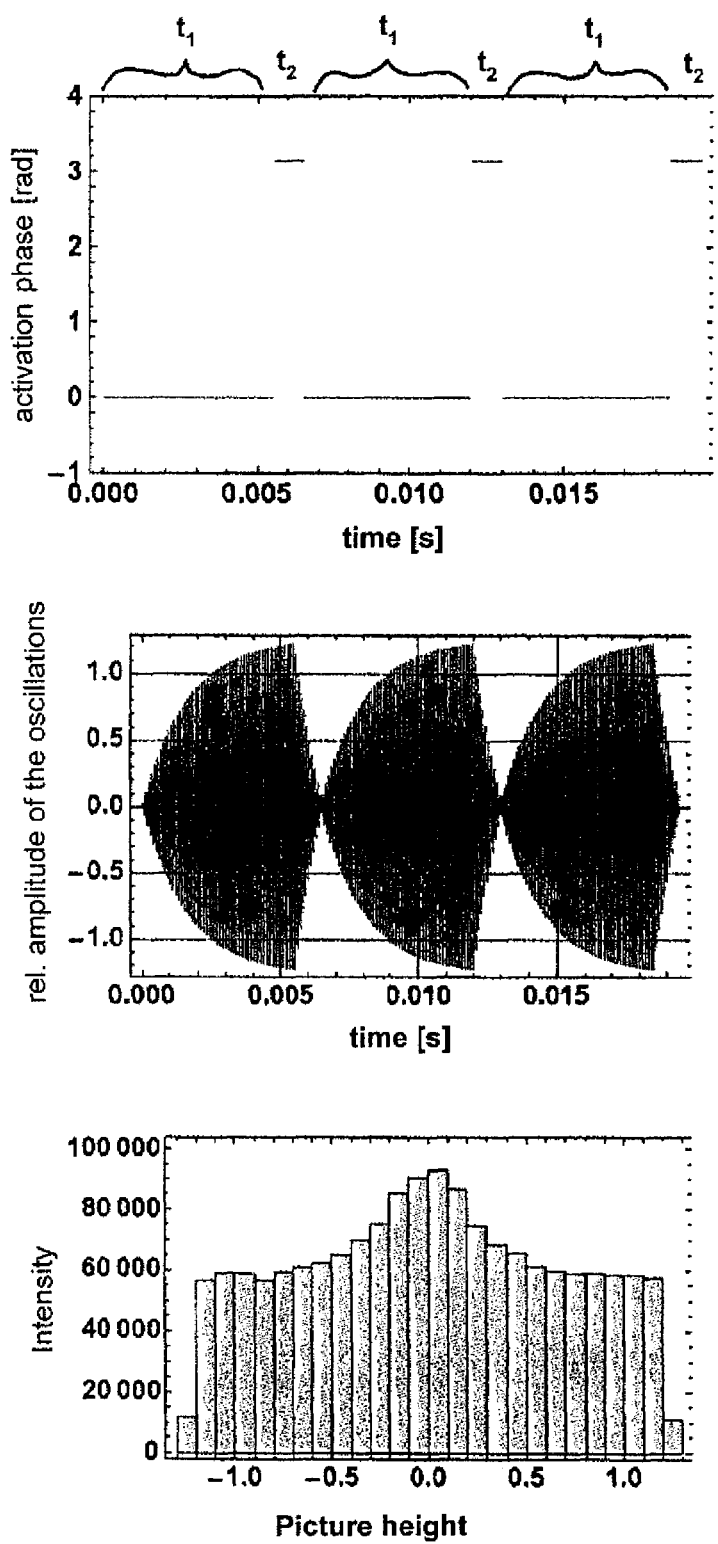
FIG. 12 a further intensity distribution (below) according to an embodiment of the application, of electromagnetic radiation along a picture height at a non-constant activation frequency (above) and non-constant turning amplitude of the oscillations (middle)

FIG. 12 is referred to hereinafter. The time intervals t1, t2 are indicated in FIG. 12. The deflection unit is activated with a constant activation frequency corresponding to the resonance frequency of the deflection unit, in the time interval t1. The activation amplitude has a maximal value in the shown example. The activation phase is constant in the time interval t1. The turning amplitude of the oscillations of the deflection unit increases during an attack time, until it reaches its largest value at the maximal amplitude.

The turning amplitude of the oscillations is constantly measured and is compared to the maximal amplitude of the oscillations. The activation phase is changed if the turning amplitude of the oscillations corresponds to the maximal amplitude of the oscillations. In the shown embodiment example, the activation phase is modulated immediately after reaching the maximal amplitude of the oscillations. The modulation of the activation phase takes place at the beginning of the time interval t2. The activation phase is hereby changed by 180° or pi. The deflection unit is driven in a counter-phased manner by way of the change of the activation phase. Oscillations of the deflection unit are braked by way of this, by which means the turning amplitude of the oscillations is reduced. The turning amplitude of the oscillations reaches a value of about zero at the end of the time interval t2. The measured light intensity shifts from the edge points of the line in the direction of the middle of the line, by way of the reduction of the turning amplitude of the oscillations. In contrast to the light intensity in FIG. 4, there is an intensity maximum in the middle of the line in FIG. 12. A minimal light intensity is measured at the edge points of the line. The activation phase in the subsequent time interval t1 is again changed by 180° or pi, subsequent to this. The deflection unit is then excited into oscillations again in phase with the activation signal. The turning amplitude of the oscillations increases again as a result of this. In the embodiment example, the time interval t1 is 5.5 ms long and the time interval t2 is 1 ms long. The resonance frequency in the shown embodiment example is 10 kHz, whereas the quality factor is 50.

Figure 13:
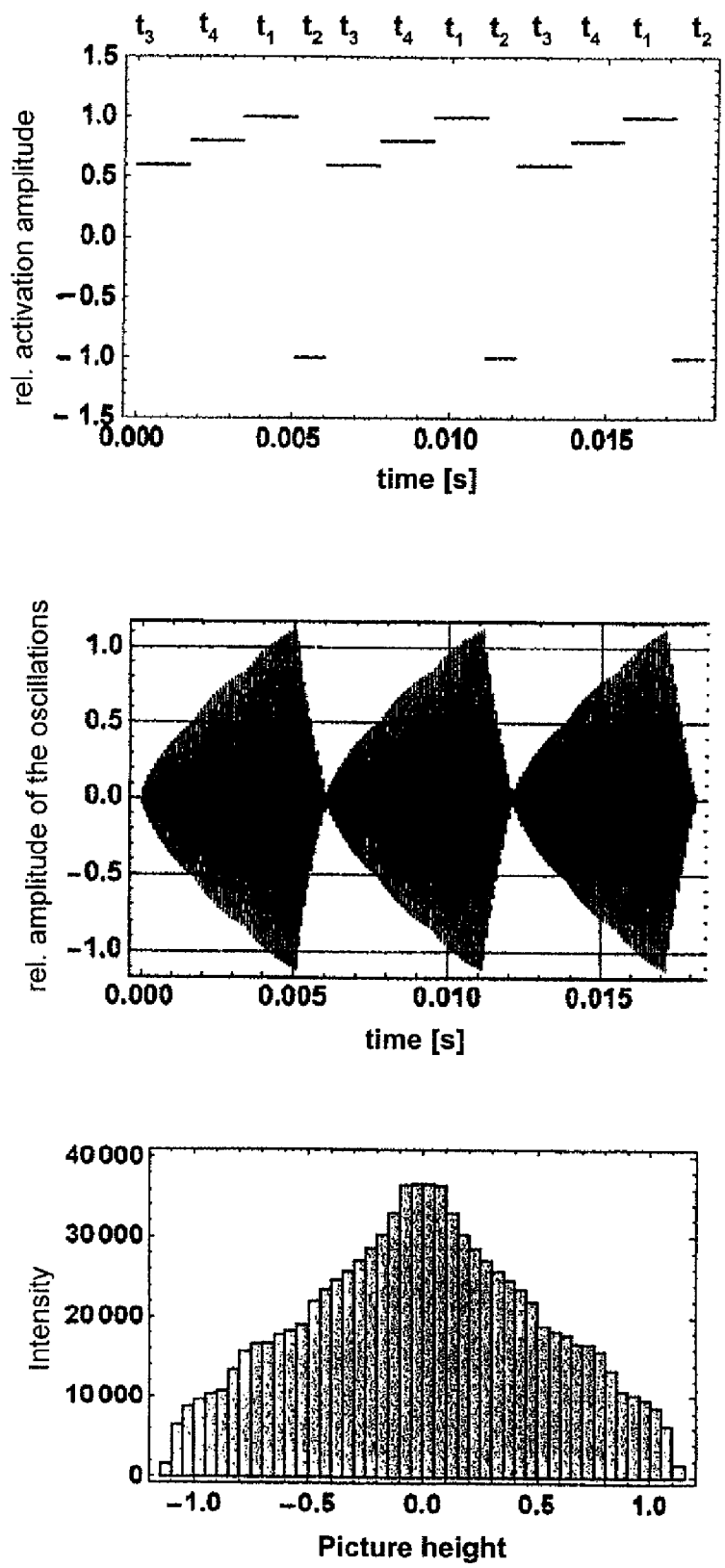
FIG. 13 a further intensity distribution (below) according to an embodiment of the application, of electromagnetic radiation along a picture height at a non-constant activation frequency (above) and a non-constant turning amplitude of the oscillations (middle).

FIG. 13 is referred to hereinafter. Time intervals t1, t2, t3, t4 are indicated in FIG. 13. The deflection unit is activated with a constant activation frequency which corresponds to the resonance frequency of the deflection unit, in the time intervals t1, t2, t3, t4. The activation amplitude has a maximal value in the time interval t1. Moreover, the activation phase is constant in the time interval t1. The control device thus activates the deflection unit with a resonant activation signal in the time interval t1. The turning amplitude of the oscillations of deflection unit increases during the oscillating-in or attack time, until it reaches its largest value at the maximal amplitude.

The turning amplitude of the oscillations is continuously measured and compared to the maximal amplitude of the oscillations. The activation phase is changed when the turning amplitude of the oscillations corresponds to the maximal amplitude. In the shown embodiment example, the activation phase is changed immediately after reaching the maximal amplitude of the oscillations. The change of the activation phase takes place at the beginning of the time interval t2. The activation phase is hereby changed by 180° or pi. The deflection unit is operated in a counter-phased manner by way of the change of the activation phase, and this in the shown example is indicated by a negative value of the activation amplitude. The oscillations of the deflection unit are braked by way of this, by which means the turning amplitude of the oscillations is reduced. The turning amplitude of the oscillations reaches a value of approximately zero at the end of the time interval t2. The activation phase is again changed by 180° or pi in the time interval t3. The activation amplitude has a value of about 60% of the maximal activation amplitude in the time interval t3. The activation amplitude is increased in the time interval t4 to a value of about 80% of the maximal activation amplitude. This leads to a further increase of the turning amplitude of the oscillations. The activation amplitude is subsequently increased to the maximal activation amplitude in the time interval t1. The activation signal is thus a resonant activation signal only in the time interval t1. The time intervals t1, t3 and t4 are equally long in the shown embodiment example, whereas the time interval t2 is roughly half the time interval t1.

Thus in FIG. 13, the activation amplitude as well as the activation phase are modulated, in order to change or to set the turning amplitude of the oscillations. The measured light intensity shifts from the edge points of the line in the direction of the middle of the line, by way of the reduction of the turning amplitude of the oscillations. There is an intensity maximum in the middle of the line in FIG. 13, in contrast to the light intensity of FIG. 4. A minimal light intensity is measured at the edge points of the line.

The measuring or determining of the amplitude of the oscillations or of the phase position of the deflection unit can alternatively also be done away with. In this case, the activation signal, for example, as in the embodiment examples of FIG. 5, 6, 7, 9, 10, 12 or 13, is set in a manner such that the turning amplitude of the oscillations at least temporarily has a value which differs from the maximal amplitude of the oscillations. The intensity pattern of the intensity distribution of the electromagnetic radiation on the projection surface 24, and which is shown in the FIG. 5, 6, 7, 9, 10, 12 or 13, can also be achieved by way of the setting. A previous calibration of the activation signal can be advantageous in this case.

Activation signals or their parameters for the respective intensity pattern of the intensity distribution of the electromagnetic radiation which is incident upon the projection surface can for example be stored on a memory of the control device and be called up.

What is claimed is:

1. A method of using an amplitude detector for activating a deflection device comprising at least one deflection unit and is for a projection device for projecting trajectories upon a projection surface, wherein the deflection device deflects electromagnetic radiation which is directed upon it, for producing trajectories, the method comprising:
    activating the at least one deflection unit by way of an activation signal delivered from a control device, for producing oscillations in each case with a turning amplitude at a direction change of the oscillation, about at least one deflection axis, wherein in the case of resonance, the oscillations have a maximal amplitude, at which the produced trajectories reach an edge of the projection surface,
    setting the activation signal in a manner such that the turning amplitude of the oscillations at least temporarily has a predefined value outside a region of the maximal amplitude of the oscillations,
    such that an intensity distribution of the produced trajectories on the projection surface with a predefined intensity pattern is achieved.

2. The method of claim 1, comprising:
    activating the at least one deflection unit by way of the activation signal delivered from the control device, for producing resonant oscillations about the at least one deflection axis,
    determining a signal that represents the turning amplitude of the oscillations of the deflection unit,
    comparing the determined signal with a value representing the maximal amplitude of the oscillations, and
    when, on comparison, the turning amplitude of the oscillations corresponds to the maximal amplitude of the oscillations, changing the activation signal in a manner such that the turning amplitude of the oscillations is at least temporarily reduced to the predefined value outside the region of the maximal amplitude of the oscillations.

3. The method of claim 1,
    wherein the deflection unit in a first time interval is activated with a first activation signal in a manner such that the maximal amplitude of the oscillations is achieved after a transient response, and the deflection unit in a second time interval is subsequently activated with a second activation signal,
    wherein the second activation signal differs from the first activation signal in a manner such that the turning amplitude of the oscillations is reduced, and.
    wherein the first time interval and the second time interval are successive.

4. The method of claim 3, wherein directly after reaching the maximal amplitude of the oscillations by way of the first activation signal, the deflection unit is activated with the second. activation signal in a manner such that the turning amplitude of the oscillations is reduced to the predefined value.

5. The method of claim 3, wherein the second activation signal is temporally constant or temporally changes or is temporally periodic, in the second time interval.

6. The method of claim 4, wherein a duration of the first time interval is smaller than a duration of the second time interval.

7. The method of claim I, wherein an activation frequency and/or an activation amplitude and/or an activation phase and/or a pulse-pause ratio of the activation signal is set or changed for achieving the predefined intensity pattern.

8. The method of claim 1, wherein the activation signal is set or changed, in a manner such that the turning amplitude of the oscillations is smaller than 95% of the maximal amplitude of the oscillations.

9. The method of claim 2., wherein the determined signal comprises the turning amplitude or a phase position of the oscillations of the deflection unit.

10. The method of claim 9, wherein the turning amplitude or the phase position of the oscillations is measured optically, capacitively, magnetically, resistively, piezoresistively, or piezoelectrically.

11. The method of claim 1, wherein the activation signal is set or changed such that the intensity distribution of the electromagnetic radiation has a local maximum at least in the middle of the projection surface and/or a local minimum at an edge of the projection surface .

12. The method of claim 1, wherein the electromagnetic radiation is deflected in manner such that a dwell time of the electromagnetic radiation in the middle of the projection surthce is greater than at an edge of the projection surface.

13. The method of claim 1, wherein the activation signal is set or changed such that the trajectories are not stationary and/or that the trajectories have no fixed repetition rate.

14. The method of claim 1, wherein the frequency of the resonant oscillations of the deflection unit is at least 1000 Hz.

15. The method of claim wherein a picture repetition rate is at least 30 Hz.

16. A deflection device for a projection device for projecting trajectories onto a projection surface and which is designed to deflect electromagnetic radiation for producing the trajectories, the deflection device comprising:
    at least one deflection unit for producing oscillations about at least one deflection axis,
    a control device for producing an activation signal for the deflection unit, and
    amplitude detector for detecting a measurement signal that represents a turning amplitude of the oscillations of the deflection unit,
    wherein the deflection device is configured for
        activating the at least one deflection unit by way of an activation signal delivered from a control device, for producing oscillations in each case with a turning amplitude at a direction change of the oscillation, about at least one deflection axis, wherein in the case of resonance, the oscillations have a maximal amplitude, at which the produced trajectories reach an edge of the projection surface,
        setting the activation signal in a manner such that the turning amplitude of the oscillations at least temporarily has a predefined value outside a region of the maximal amplitude of the oscillations,
        such that an intensity distribution of the produced trajectories on the projection surface with a predefined intensity pattern is achieved.

17. A projection device with a deflection device according to claim 16 and with a radiation source for producing electromagnetic radiation with a first wavelength or a first wavelength region,
    wherein an illumination screen is provided as a projection surface and is designed to convert the first wavelength or the first wavelength region of the deflected electromagnetic radiation into a second wavelength or a second wavelength region.

18. The projection device according to claim 17, wherein a modulation unit is provided for modulating the intensity of the electromagnetic radiation of the radiation source in a manner depending on a picture to be projected and on a location of the electromagnetic radiation on the projection surface.

* * * * *